Patented Jan. 13, 1942

2,270,105

UNITED STATES PATENT OFFICE 2,270,105

LUMINESCENT MATERIAL AND METHOD OF MANUFACTURE

James N. Bowtell, Sudbury, Henry G. Jenkins, Pinner, and Alfred H. McKeag, North Wembley, England, assignors to General Electric Company, a corporation of New York No Drawing. Application April 18, 1940. Serial No. 330,372
In Great Britain April 19, 1939

3 Claims. (Cl. 250—81)

Our invention relates to light producing means comprising in combination a source adapted, when in operation, to emit either the mercury or a rare gas and particularly the neon spectrum, and luminescent material exposed to the radiation of the said source during its operation and thereby excited to luminescence by it. More particularly, our invention relates to a luminescent material for such light producing means, and to a method of preparing such luminescent material.

Calcium tungstate is well known as the luminescent material in means of this type. More recently magnesium tungstate (as disclosed in British Patent No. 469,732) and zinc tungstate (as disclosed in British Patent No. 469,913) have replaced calcium tungstate for many purposes, especially when the source of exciting radiations emits the mercury and not the neon spectrum, because the luminescent efficiency of such tungstates is higher than that of calcium tungstate. More recently still, magnesium-cadmium tungstate has been proposed, as disclosed in co-pending U. S. application Serial No. 235,914, filed October 19, 1938. Calcium tungstate differs from these three substances in emitting light of a much more saturated blue.

Cadmium tungstate is known to be luminescent under suitable exciting agencies, but so far as we are aware, it has never been used in any commercial light source of the type specified, or offered for commercial sale as a luminescent material. The reason is probably that it has been found difficult to prepare it by the method usually employed in the manufacture of other luminescent tungstates so that it has a luminescent efficiency comparable even with that of calcium tungstate.

One object of our invention is to provide luminescent cadmium tungstate having a luminescent efficiency at least as great as that of calcium tungstate and not very greatly less than that of magnesium tungstate.

Another object of our invention is to provide a method of preparing cadmium tungstate having such improved luminescent efficiency. The color of the luminescent light emitted by cadmium tungstate prepared by our improved method resembles that of magnesium tungstate rather than that of calcium tungstate.

According to the invention, in light producing means of the type specified, the luminescent material is, or comprises a substantial proportion of, luminescent cadmium tungstate.

In view of the said co-pending application, it is to be understood that in the preceding statement the words have their conventional meaning. When luminescent material is said to comprise luminescent material X, it is to be understood that the presence of any material other than luminescent material X is not associated with X so as to change the luminescent properties of X. Thus, the material described in the said co-pending application does not comprise either magnesium or cadmium tungstate, because in that material the two tungstates are associated so that each affects the luminescent properties of the other.

One method of preparing luminescent cadmium tungstate according to our invention will now be described by way of example.

198 gm. of sodium tungstate of AnalaR (analytical reagent) grade is dissolved in 1 litre (1000 ml.) of hot distilled water. The resulting solution is called solution A. While the volume of water is slightly increased due to the addition of the sodium tungstate, for the purposes of computation, the volume of the resulting solution may be assumed to equal approximately 1 litre or 1000 ml.

154 gm. of cadmium sulphate of AnalaR (analytical reagent) grade is dissolved in 1 litre of hot distilled water. The resulting solution is called solution B. Here again, for purposes of computation, the volume of solution B may be considered to equal approximately 1 litre or 1000 ml.

10 ml. (i. e. approximately 1%) of solution A is added to the whole of solution B. The resulting precipitate is filtered off and discarded.

The remainder (i. e. approximately 99%) of solution A is then added to the filtrate. The precipitate is filtered off, washed 6 times with hot distilled water and dried at 180° C. It is then heated at 875° C. for one hour in air, washed again 6 times with hot distilled water, and dried at 180° C. in air. The resulting material is then the improved luminescent cadmium tungstate comprising our invention.

It is to be observed that the deliberate introduction of an activator, such as lead, is not necessary; but the use of activators is not excluded. It is well-known that contradictory statements have been made about the necessity or desirability of activators in tungstates. It is likely that the same difficulty will arise in determining the advisiblity of employing activators in cadmium tungstate.

As has been said, luminescent cadmium tungstate resembles magnesium tungstate in its luminescent properties rather than calcium tungstate, and is therefore, in general, better adapted to replace the former rather than the latter. It may be used inside a low pressure mercury vapour lamp, or outside a high-pressure mercury-vapour lamp so long as its envelope is sufficiently transparent to short-wave radiation. It may also be used inside a neon discharge tube.

What we claim as new and desire to secure by Letters Patent of the United States is:

1. A method of producing luminescent cadmium tungstate which comprises preparing a solution A of pure sodium tungstate dissolved in distilled water in the proportions of 198 grams of sodium tungstate to 1 litre of water, preparing a substantially equivalent amount of a solution B of pure cadmium sulphate dissolved in distilled water in the proportions of 154 grams of cadmium sulphate to 1 litre of water, adding approximately 1% of solution A to the whole of solution B and filtering off the precipitate, adding to the resulting filtrate the remainder of solution A and again filtering off the precipitate, then washing the latter precipitate in distilled water, drying it, and heating it at approximately 875° C. for one hour in air.

2. A method of preparing luminescent cadmium tungstate which comprises mixing an aqueous solution of alkali tungstate with a substantially equivalent amount of an aqueous solution of cadmium sulphate, adding approximately one per cent of the alkali tungstate solution to the cadmium sulphate solution and filtering off the precipitate, adding to the resulting filtrate the remainder of the alkali tungstate solution and again filtering off the precipitate, washing the latter precipitate, drying it, and then heating it at a temperature of approximately 875° C. to form the luminescent cadmium tungstate.

3. A method of preparing luminescent cadmium tungstate which comprises mixing an aqueous solution of sodium tungstate with a substantially equivalent amount of an aqueous solution of cadmium sulphate, adding approximately one per cent of the sodium tungstate solution to the cadmium sulphate solution and filtering off the precipitate, adding to the resulting filtrate the remainder of the sodium tungstate solution and again filtering off the precipitate, washing the latter precipitate, drying it, and then heating it at a temperature of approximately 875° C. to form the luminescent cadmium tungstate.

JAMES N. BOWTELL.
HENRY G. JENKINS.
ALFRED H. McKEAG.